3,260,688
RESIN COMPOSITIONS FOR PRODUCING CELLULAR MASSES AND PROCESS FOR PRODUCING A CELLULAR PRODUCT
Takeshi Watanabe, Kamakura, Kanagawa, Masayuki Namba, Otaku, Tokyo, and Shigeo Makino, Kamakura, Kanagawa, Japan, assignors to Toyo Koatsu Industries, Inc., Tokyo, Japan, a corporation of Japan
No Drawing. Filed Aug. 10, 1962, Ser. No. 216,066
14 Claims. (Cl. 260—2.5)

This invention relates to unsaturated polyester resin compositions for producing cellular masses and the cellular resin structures fabricated therefrom which comprises employing a mixture of an unsaturated polyester resin, a cross-linking compound, e.g., a vinyl-polymerizable monomer, and an agent having anionic surface active properties selected from the group consisting of salts of organic esters of sulfuric acid, salts of organic esters of phosphoric acid and organic sulfonic acid salts.

According to the prior art, cellular masses from unsaturated polyester resins were prepared by curing the resins after foaming by: (1) the gas evolved from an added foaming agent; (2) evolution of a gas which had been previously dissolved in the resin; (3) dispersing a gas (e.g., air) in the resin by means of agitation; or (4) a combination of any two or more of the processes mentioned in (1) to (3) above.

In the foaming process, the foams made from unsaturated polyester resins and cross-linking agents, in general, are so unstable that they gather and break quickly in a few seconds to a few minutes. According to the prior art, therefore, cellular mass having a low specific gravity and uniformly minute cells were unobtainable, because the foams cohere and break before gelation of resin in course of curing unsaturated polyester resins. Though attempts were made to cure unsaturated polyester resins simultaneously with their foaming, it was found to be very difficult to synchronize the period of curing with that of foaming and expansion.

This invention is based on the surprising discovery that foamed unsaturated polyester resins having extremely low specific gravities and exceedingly minute cells that are stable for many minutes to a few hours are readily obtained by adding at least one kind of salts selected from a group consisting of salts of organic esters of sulfuric acid, salts of organic esters of phosphoric acid and organic sulfonic acid salts to conventional mixtures of unsaturated polyester resins and cross-linking agents and foaming by any of the above-mentioned foaming methods. Upon curing the foamed resins thus produced, cellular resin masses of excellent properties having exceedingly uniform and minute cells are obtained.

It is an object of this invention to provide unsaturated polyester resin compositions capable of producing cured cellular masses of extremely low specific gravity consisting of exceedingly uniform and minute cells and to provide cellular resin structures fabricated with said unsaturated polyester resin compositions.

According to the process of this invention, foams are formed by the application of any of the above-mentioned foaming methods to a mixture containing a ratio of 100 parts of a conventional mixture of an unsaturated polyester resin and cross-linking agent to 0.1–50 parts of at least one of the salts set forth above, including a suitable amount of a catalyst and/or an accelerator and either including or not including a filler, a reinforcing agent and a colorant for the unsatuarted polyester resin and cross-linking agent; and curing the mixture at room temperatures or high temperatures.

It has also been discovered that inorganic fillers having a particle size of $1\mu$ or less improve the stability of foams in the uncured state and provide extremely low densities and exceedingly minute cells on the cured foam.

Salts of organic esters of sulfuric acid employed in this invention include the inorganic salts, such as sodium, potassium, calcium, aluminum, ammonium, and magnesium salts, and the organic salts, such as monoethanolamine, diethanolamine, and triethanolamine salts of the sulfuric acid esters of saturated and unsaturated alcohols, such as: (1) monohydric aliphatic hydrocarbon alcohols containing from 1 to 30 carbon atoms, such as lauryl alcohol, octyl alcohol, decyl alcohol, myristyl alcohol, cetyl alcohol, stearyl alcohol, oleyl alcohol, 7-ethyl-2-methyl undecanol-4, 3,9-diethyltridecanol-6, and dicapryl alcohol, etc.; (2) monohydric arylalkyl alcohols containing from 7 to 40 carbon atoms, such as benzyl alcohol, etc.; and (3) alcohols consisting of adducts of alkylene oxide containing from 2 to 4 carbon atoms, such as ethylene oxide, etc. to phenols containing from 6 to 40 carbon atoms including alkylphenols, such as p-octyl phenol, p-dodecyl phenol, etc.

Illustrative salts of organic esters of sulfuric acid include sodium lauryl sulfate, ammonium lauryl sulfate, triethanolamine lauryl sulfate, sodium cetyl sulfate, sodium oleyl sulfate, sodium tridecyl sulfate, sodium isooctyl sulfate, triethanolamine decyl sulfate, magnesium 7-ethyl-2-methylundecyl-4 sulfate, calcium benzyl sulfate, and the like.

Salts of organic esters of phosphoric acid employed in this invention are the inorganic salts, such as the sodium, potassium, calcium, magnesium, and aluminum salts and the organic basic salts, such as the monoethanolamine, diethanolamine, and triethanolamine salts, of the monoester or diester produced by the reaction of phosphoric acid with saturated and unsaturated alcohols containing at least one hydroxyl group; e.g., (1) aliphatic hydrocarbon monohydric alcohols containing from 1 to 30 carbon atoms, such as butyl alcohol, lauryl alcohol, octyl alcohol, 2-ethyl hexanol, tetradecyl alcohol, hexadecyl alcohol, heptadecyl alcohol, stearyl alcohol and oleyl alcohol, (2) dihydric alcohols containing from 2 to 30 carbon atoms, such as ethylene glycol and aryl, (3) alkyl alcohols containing from 7 to 40 carbon atoms, such as benzyl alcohol or the mixed salts of the above-mention monoester and diester.

Illustrative of salts of organic esters of phosphoric acid include triethanolamine 2-ethylhexyl phosphoric acid monoester, triethanolamine 2-ethylhexyl phosphoric acid diester, sodium dilauryl phosphate, ammonium butyl phosphoric acid monoester, magnesium hexadecyl phosphoric acid monoester, calcium octyl phosphoric acid monoester, potassium distearyl phosphate, monoethanolamine dibenzyl phosphate, diethanolamine oleyl phosphoric acid monoester, and the like.

Organic sulfonic acid salts employed in this invention are the inorganic salts, such as the sodium, potassium, calcium, magnesium, and aluminum salts and the organic basic salts, e.g., the monoethanolamine, diethanolamine, and triethanolamine salts of: (1) aliphatic hydrocarbon sulfonic acids containing from 1 to 30 carbon atoms, such as butyl, octyl, decyl, cetyl, lauryl, myristyl, oleyl, and stearyl sulfonic acids; (2) aryl alkyl sulfonic acids containing from 7 to 40 carbon atoms, such as octyl benzene, lauryl benzene, and butyl naphthalene sulfonic acids, etc.; (3) aliphatic sulfonic acids whose hydrogen in the aliphatic hydrocarbon groups containing from 1 to 30 carbon atoms has been substituted by other aryl alkyl groups containing from 7 to 40 carbon atoms, such as the sulfonic acid obtained by the addition reaction of dodecyl benzene and isobutene sulfonic acid.

Illustrative organic sulfonic acid salts include sodium laurylbenzenesulfonate, magnesium stearylsulfonate, calcium butylsulfonate, potassium butylnaphthalenesulfonate, triethanolamine octylbenzenesulfonate, aluminum decylsulfonate, diethanolamine oleylsulfonate, monoethanolamine dodecylbenzylbutylsulfonate, and the like.

The amount of such salts added by this invention to the unsaturated polyester resins depends upon the kind of the said surface active agent added, the kind of unsaturated polyester resin employed, the foaming temperature and the specific gravity of the cellular mass desired, etc. Therefore, the amount of the salt added is determined by the particular combination of conditions and the quality of foam desired. In general, however, 0.1–50 parts of at least one salt are employed for each 100 parts of the mixture of unsaturated polyester resin and cross-linking agent.

By the term "unsaturated polyester resins," as used herein, is meant the unsaturated alkyds obtained by the esterification of organic acids of $\alpha,\beta$-unsaturated dibasic acids with or without organic acids of saturated dibasic acids and/or organic acids of saturated and/or unsaturated monobasic acids with alcohols, i.e., glycols, polyhydric alcohols and monohydric alcohols. The unsaturation is imparted to the resin by employing unsaturated monobasic or dibasic acids or unsaturated monohydric or dihydric alcohols or any combination of such unsaturated reactants. Such resins are dissolved in a cross-linking agent and usually contain a small amount of a polymerization inhibitor, and either contain or do not contain other modifying agents to provide air-drying properties, light resistance, flame resistance and flexibility.

Illustrative organic acids employed in preparing the unsaturated polyester resins include: (1) $\alpha,\beta$-unsaturated dibasic acids including maleic acid (or maleic anhydride), fumaric acid, itaconic acid, mesaconic acid, citraconic acid, methylenemalonic acid, etc., (2) saturated dibasic acids including phthalic acid, monochlorophthalic acid, dichlorophthalic acid, tricholorophthalic acid, tetrachlorophthalic acid, isophthalic acid, terephthalic acid, hexachloroendomethylene tetrahydrophthalic anhydride ("HET" acid), diphenic acid, malonic acid, methylmalonic acid, succinic acid, glutaric acid, chloromaleic acid, acetylmalonic acid, adipic acid, sebacic acid or the anhydrides thereof, and (3) monobasic acids including saturated fatty acids, such as acetic acid, propionic acid, butyric acid, benzoic acid, pelargonic acid or the anhydrides thereof, and unsaturated monobasic acids, such as acrylic acid, methacrylic acid, crotonic acid, cinnamic acid, stearic acid or the anhydrides thereof, cotton seed oil fatty acid, soya-bean oil fatty acid and wood oil fatty acid which contain the above-mentioned saturated and unsaturated monobasic acids.

Illustrative alcohols employed for the preparation of the unsaturated polyester resins include: (1) glycols including ethylene glycol, diethylene glycol, triethylene glycol, propylene glycol, butanediol-2,3, neopentyl glycol, diethylene glycol, bisphenol-A-ether, hydrogenated bisphenol-A, 2-butene-1,4-diol, etc.; (2) polyhydric alcohols including glycerin, hexanetriol, tris (hydroxy methyl) propane, pentaerythritol, mannitol, sorbitol, etc.; and (3) monohydric alcohols including methanol, ethanol, butanol, propanol, isopropanol, isobutanol, benzyl alcohol, allyl alcohol, ethallyl alcohol, methallyl alcohol, chloroallyl alcohol, cinnamic alcohol, etc.

Illustrative cross-linking agents are such compounds as are polymerizable with the unsaturated polyester resin via unsaturated groups and include vinyl compounds, allyl compounds, acrylic compounds and vinylidene compounds. Examples of vinyl compounds are vinyl acetate, vinyl propionic acid, vinyl butyrate, vinyl benzoic acid, vinyl pelargonic acid, vinyl chloroacetate, vinyl chlorobenzoic acid, styrene, vinyl toluene, monochlorostyrene, dichlorostyrene, trichlorostyrene, tetrachlorostyrene, mono- or poly-nitrostyrene, mono- or poly-alkylstyrene, $\alpha$-methylstyrene, $\alpha$-alkylstyrene, vinyl naphthalene. Examples of allyl compounds are allyl acetate, allyl butyrate, allyl benzoic acid, diallyl phthalate, diallyl succinic acid, diallyl oxalate, diallyl azelaic acid, diallyl adipic acid, diallyl maleate, diallyl terephthalic acid, triallyl citric acid, triallyl cyanuric acid, triallyl isocyanuric acid, alkylol melamine allyl ether, acrolein allyl acetal, glyoxal allyl acetal, or the above-mentioned allyl compounds whose allyl groups have been substituted by methallyl, ethallyl, chloroallyl, etc. Examples of acrylic compounds are the various derivatives of acrylic acid such as esters, amides, nitriles of acrylic acid, methacrylic acid, $\alpha$-alkyl, acrylic acids and $\alpha$-allyl acrylic acid.

The polymerization inhibitors employed in our invention are those that have been used in conventional unsaturated polyester resins, i.e., polyhydric phenols such as hydroquinone, paratertiary butyl catechol; quinones such as tetrachloroquinone, naphthoquinone; aromatic nitro compounds such as dinitrobenzene; aromatic amines such as phenol-$\beta$-naphthylamine; quaternary ammonium salts such as tribenzyl ammonium chloride; copper naphthenate, etc.

In addition to the above, the following modifying agents can be added to the compositions of this invention: (1) paraffin and Japan wax to avoid curing disturbance due to oxygen; (2) light stabilizers to prevent coloring of resins by ultraviolet rays; (3) oxidation inhibitors to avoid degradation and discoloring of resins by oxidation; (4) special agents to impart special properties, e.g., to increase flame resistance, for example, chlorine-containing phosphoric esters such as chlorinated paraffin, polychloro diphenyl, trichloro ethyl phosphate, etc.; (5) plasticizers to provide flexibility, for example, dimethyl phthalate, dibutyl phthalate, dioctyl phthalate, etc.; (6) fillers and/or a reinforcing agent.

The fillers which can be employed in the compositions of this invention are inorganic and organic solid minute particles of, for example, calcium carbonate, calcium phosphate, calcium sulfate, barium sulfate, silicic anhydride, silica gel, antimony oxide, glass powders, powdered mica, clay, iron powder, aluminum powder, iron sand, wood flour, polymer compounds such as starch, various cellulose derivatives, polyvinyl compounds, e.g., polyethylene, polystyrene, polyvinyl chloride and polyacrylonitrile. Improvement in the mechanical properties, heat resistance and decrease in the cost of the final cellular polyester resin products can be expected by the addition of at least one kind of the above-mentioned fillers. By the addition of 0.1–20 parts of inorganic fillers such as those mentioned above whose particle diameters are less than $1\mu$ for 100 parts of the mixture of unsaturated polyester resins and cross-linking agent, the fillers become minute nuclei at the initiation of foaming, causing more stable, more minute and more uniform cells to form.

Suitable reinforcing agents include inorganic and organic fibers, for example, asbestos, glass fiber, various kinds of synthetic fibers, various kinds of natural fibers, various kinds of regenerated fibers, etc. in the form of threads mats and cloths.

The foaming agents employed in this invention depend upon the desired manner of producing the foams. Generally, foaming is carried out by mixing, dispersing or dissolving: (1) normal gases, such as air, nitrogen, carbon dioxide, etc., (2) liquefied gases whose vapor pressure is at least 2 atmospheres at 25° C., for example, liquefied carbon dioxide, Freon, propane, or (3) solidified carbon dioxide, etc., in the resins. Foaming agents include inorganic and organic compounds which evolve nitrogen gas, carbon dioxide gas, ammonia gas, etc. at high temperatures, for example, ammonium bicarbonate, sodium bicarbonate, ammonium carbonate, dinitroso pentamethylene - tetramine, benzenesulfonyl-3-methyl-3-phenyl triazene, benzenesulfonyl-3-methylparaphenyl triazene, benzenesulfonyl-3-methyl-3-parachlorophenyl triazene, paratertiary butyl benzoylazide, furoyl azide, cinnamoyl azide, N,N,-dimethyl-N, N-dinitroso terephthalamide, urea derivatives, diazo-amino derivatives, azo-bisisobutyronitrile, azo-dicarboxylic acid derivatives, hydrazine derivatives of organic sulfonic acid, etc.

The choice of the catalysts and accelerators employed in this invention depends mainly upon the desired curing temperatures. The catalysts employed in our invention are those of the organic peroxides used for curing of conventional unsaturated polyester resins, for example, cumene hydroperoxide, tertiary butyl hydroperoxide, benzoyl peroxide, tertiary butyl perbenzoate, acetyl benzoyl peroxide, methyl ethyl ketone peroxide, methyl isobutyl ketone peroxide, capryl peroxide, lauroyl peroxide, hydroxy heptyl peroxide, hydroxy cyclohexyl hydroperoxide, etc.

As accelerators the following are employed: metallic salts such as cobalt naphthenate, cobalt octoate, zinc dichloride; phenylsulfinic acid, p-toluenesulfonic acid, triethanolamine, diethylaniline, N-ethyl-meta-toluidine, 1,2-propylenediamine, 4,4-tetramethyl - diaminophenylmethane, bis-hydroxy-isopropyl-p-toluidine, dodecyl mercaptan, etc.

The catalyst and the accelerator may be added together, while mixing, to the unsaturated polyester resin mixture containing the cross-linking agent, and the salt before initiation of foaming or during foaming, but the accelerator and the catalyst may also be separately added to the resin mixture.

The foamed unsaturated polyester resin composition, according to the process of our invention, is cured by means of the above-mentioned catalyst or together with the accelerator, either at normal temperature or upon heating. When said unsaturated polyester resin compositions were cured at normal temperature, however, a considerable retardation tendency in the gelation and in curing of the resin has been often observed compared with of conventional non-cellular unsaturated polyester resins of massive, plate-like and bar-like shapes. This retardation is attributed to the presence of the oxygen and moisture in the air or to the impurities contained in the salts employed. When their adverse effects were considerable and the gelation of resin was exceedingly retarded, a portion of the bubbles break and efficiency in the curing of cellular resin decreases, resulting in poor quality cured foams. It has been found that the curing of resin at normal temperature can be greatly accelerated by employment of at least one kind of non-hydro peroxide or by joint employment of tertiary amines together with the non-hydro peroxide or hydroperoxide to accelerate the action of the said non-hydro peroxide.

The catalysts and accelerators employed in the present invention include, in addition to the above-mentioned catalyst and accelerators, the following recommended catalysts and accelerators: (1) Non-hydro peroxides including: for example, tertiary dialkyl peroxides such as di-t-butyl peroxide; diacyl peroxides such as acetyl peroxide, lauroyl peroxide, benzoyl peroxide, p-chlorobenzoyl peroxide, 2,4-dichlorobenzoyl peroxide, etc.; (2) peroxy esters such as t-butyl peracetate, t-butyl perbenzoate, di-t-butyl diperphthalate, t-butyl permaleic acid, t-butyl perphthalic acid, diisopropyl peroxy dicarbonate, etc.; (3) polyalkylidene peroxide such as cyclohexanone peroxide; etc. The tertiary amines include: aliphatic tertiary amines such as tributylamine, triethanolamine, trihexylamine, etc.; aromatic tertiary amines such as dimethylamine, diethylaniline, dimethyl paratoluidine, diethyl ortho-toluidine, phenyl ethyl butylamine; etc.

The process of the present invention is carried out as follows. A mixture, consisting at the rate of 100 parts of an unsaturated polyester resin composition to 0.1–50 parts of at least one kind of salt selected from the group consisting of salts of sulfuric acid esters, salts of acidic phosphoric acid esters, organic sulfonic acid salts, and at least one kind of catalyst or at least one kind each of a catalyst and an accelerator and including either one or both of a filler and/or a reinforcing agent or neither including a filler nor reinforcing agent, is foamed by: (1) the gas evolved from a foaming agent, (2) dissolved a gas in the resin composition and discharging the gas dissolved in the resin composition by reducing pressure or by heating, (3) mixing a gas with the resin composition by agitation or dispersion, (4) combinations of methods mentioned in (1) to (3) above. Subsequently, the resin composition is cured into any shapes desired at normal temperature or under heating, e.g., high frequency heating.

In order to fabricate cellular resin products of desired shapes the resin composition is foamed after pouring the resin into metallic molds or molds of desired shapes made of other materials or the resin composition is poured while it is being foamed or after it has been foamed, and then it is cured. Cellular structures thus produced are of excellent quality in respect of light weight, heat insulating properties, strength and water resisting properties. As other applications, the resin composition may be poured, while it is being foamed or after it has been foamed, on the surface of a wall provided with a suitable support or that of a plant-like material or into a proper space between 2 walls or that of 2 plant-like materials, and curing the resin composition at room temperature or under heating. Thus, any complicated space can be readily filled with the resin composition and simultaneously with the curing of the resin composition it firmly adheres to the material of the wall.

The process will be further illustrated in conjunction with the following specific examples. It should be understood, however, that the examples are given for the purpose of illustration and not by way of limitation. The parts hereinafter mentioned are represented by weight.

EXAMPLE 1

The foaminess of the unsaturated polyester resin compositions prepared according to the process of this invention and the stability of the foams thereof were measured as follows.

One hundred grams of a sample were placed in a beaker of about 120 mm. in diameter provided with a gate-type agitator, and the sample was agitated by the agitator at 650 r.p.m. for 5 minutes. Immediately, 8 g. of the sample was placed in a test tube of 15 mm. in diameter and the height of the sample at this point is represented by $h_0$.

The height of the sample after allowing the test tube to stand at room temperature for 30 minutes is represented by $h_{30}$, and the height of unfoamed liquid resin composition of the same weight, which is sampled separately in another tube, is represented by $h_\infty$. The symbol $h_\infty$ is considered as the point when the foam substantially disappears after allowing the test tube to stand for many hours.

The foaminess and the foam stability are represented by the following equations.

Foaminess:
$$\frac{h_0 - h_\infty}{h_\infty} \times 100$$

Foam stability:
$$\frac{h_{30} - h_\infty}{h_0 - h_\infty} \times 100$$

In general, it will be seen that the numerical values for the foaminess are upward of zero and those for the foam stability are upward of zero and less than 100.

The values of foaminess and foam stability described in the following examples means those obtained by the above-mentioned way.

Ninety-eight parts of maleic anhydride, 148 parts of phthalic anhydride, 84 parts of propylene glycol and 117 parts of diethylene glycol were subjected to an esterification under heating to obtain 410 parts of an unsaturated alkyd having an acid value of 40. Sixty-five parts of styrene monomer including 0.03 part of hydroquinone and 0.15 part of paraffin were added to, sufficiently mixed with, and dissolved in, 100 parts of the said unsaturated alkyd to obtain 150 parts of an unsaturated polyester resin composition. The foaminess and foam stability of this resin composition at room temperature with no addition of said salt were respectively 150 and zero. But the foaminess and foam stability increased, especially the latter, as shown below, in the case of additions of 0.1, 2, 5, 10, 20 and 30 parts respectively of the triethanolamine salt of 2-ethylhexyl phosphoric monoester to 100 parts of the above-mentioned unsaturated polyester resin composition.

| Amount added (in parts) | Foaminess | Foam stability |
|---|---|---|
| 0 | 150 | 0 |
| 0.1 | 150 | 90 |
| 2 | 210 | 90 |
| 5 | 270 | 100 |
| 10 | 300 | 95 |
| 20 | 180 | 92 |
| 30 | 160 | 100 |

EXAMPLE 2

0.75 part of benzoyl peroxide and 0.1 part of dimethylaniline were added to a mixture comprising 100 parts of the unsaturated polyester resin composition described in Example 1 above and 10 parts of the triethanolamine salt of 2-ethylhexyl phosphoric monoester. The resulting mixture was agitated and foamed at room temperature for 20 minutes by the agitator employed in Example 1. The mixture gelled in 10 minutes after the agitation was over and it took another 30 minutes until the curing was completed. A cellular resin product having exceedingly minute cells and a specific gravity of 0.02 was obtained.

On the other hand, 2 parts of methyl ethyl ketone peroxide and 2 parts of cobalt naphthenate were added in place of benzoyl peroxide and dimethylaniline to the same mixture as above-mentioned of 100 parts of the unsaturated polyester resin composition and 10 parts of the triethanolamine salt of 2-ethylhexyl phosphoric monoester, and the mixture was foamed under agitation. It gelled in 1 hour after the agitation ended, and it took another 1.5 hours to complete the curing.

EXAMPLE 3

The mixture of exactly the same amounts of the resin composition, triethanolamine salt, catalyst and accelerator as in the former case of Example 2 above was agitated in an autoclave filled with nitrogen gas of 5 atm. After agitating the mixture for 20 minutes the pressure was reduced to normal pressure to obtain a foamed unsaturated polyester resin composition having a specific gravity of 0.03 and comprising minute bubbles. The said foams were so stable that after allowing them to stand for 20 minutes no decrease in their volume was observed, and after 7 minutes subsequent to reducing the pressure the foams exothermically cured at normal temperature to obtain a cellular resin product having uniformly minute cells with an average diameter of about 150μ.

EXAMPLE 4

To 100 parts of the same resin composition employed as in Example 3 were added 10 parts of superfine grain calcium carbonate having grain diameters of 0.2–0.8μ. The mixture was foamed in exactly the same way as in Example 3 to obtain an exceedingly stable foam having a specific gravity of 0.03 and more minute bubbles than those obtained in Example 3. After 7 minutes subsequent to the agitation for 20 minutes at normal temperature the foamed resin cured exothermically to obtain a cellular resin product having uniform, exceedingly minute bubbles of about 70μ in average diameter.

EXAMPLE 5

To 95 parts of the resin composition described in Example 1 above were added 5 parts respectively of aluminum stearate, calcium stearate, sodium lauryl benzenesulfonate, sodium lauryl sulfate and sodium 2-ethylhexyl phosphoric monoester to impart a remarkable stability in the resin foams. The results are shown below.

Foaminess and foam stability at 25° C. with various anionic surface active agents

| Anionic surface active agent | Foaminess | Foam stability |
|---|---|---|
| Aluminum stearate | 80 | 90 |
| Calcium stearate | 120 | 100 |
| Sodium lauryl benzenesulfonate | 180 | 102 |
| Sodium lauryl sulfate | 210 | 91 |
| Sodium salt of 2-ethylhexyl phosphoric monoester | 240 | 100 |

EXAMPLE 6

To a mixture comprising 100 parts of the same unsaturated polyester resin composition as in Example 1 above and 0.5 part of triethanolamine salt of 2-ethylhexyl phosphoric diester were added calcium carbonate powder of about 0.8μ in diameter and silicic anhydride of about 0.05μ in diameter to obtain the following foaminess and foam stability at 25° C. It was found out that that stability had increased by the addition of these fillers.

| Filler | Amount added (parts) | Foaminess | Foam stability |
|---|---|---|---|
| Calcium carbonate | 1.0 | 170 | 90 |
| Do | 5.0 | 160 | 100 |
| Do | 10.0 | 150 | 100 |
| Silicic anhydride | 0.1 | 180 | 95 |
| Do | 1.0 | 150 | 100 |
| Do | 3.0 | 140 | 100 |
| None | None | 190 | 85 |

EXAMPLE 7

One hundred and fifty parts of diallyl phthalate, in which 0.03 part of hydroquinone had been dissolved, were added to 100 parts of the unsaturated alkyd described in Example 1 above to obtain an unsaturated polyester resin composition. To 95 parts of this resin composition were added 5 parts of sodium lauryl benzenesulfonate, 1 part of benzoyl peroxide, and 0.4 part of dimethylaniline to obtain a resin composition whose foaminess and foam stability at room temperature were 185 and 101 respectively. This composition was foamed by the same method as described in Example 3 above to obtain a stable resin foam, which cured exothermically in 30 minutes after expanding to obtain a cellular resin product having a specific gravity of 0.03 and minute cells of about 130μ in average diameter.

On the other hand, the resin obtained without the addition of sodium lauryl benzenesulfonate showed a foaminess of 180 and foam stability of zero at room temperature.

EXAMPLE 8

One hundred and ninety-five parts of HET acid, 49 parts of maleic anhydride and 84 parts of propylene glycol were subjected to a dehydration reaction at 180° C. to obtain 310 parts of a chlorine-containing unsaturated alkyd. Twenty-five parts of styrene monomer, in which 0.006 part of paratertiary butyl catechol and 0.0002 part of copper naphthenate had been dissolved, were added to 100 parts of the said chlorine-containing unsaturated alkyd and sufficiently mixed and dissolved to obtain 125 parts of a flame-resistant unsaturated polyester resin composition which showed the foaminess of 125 and foam stability of zero at 100° C.

Ten parts of triethanolamine salt of 2-ethylhexyl phosphoric diester were added to 90 parts of said flame-resistant unsaturated polyester resin composition to obtain a resin composition which had a foaminess of 130 and foam stability of 100 at 100° C.

To 100 parts of said composition were added 10 parts of ammonium bicarbonate and 2 parts of di-tert.-butyl peroxide, and the mixture was heated for ten minutes at 110° C. to complete the foaming of the mixture. It cured in another 10 minutes to provide a cellular resin product having uniformly minute cells of about 160μ in average diameter and a specific gravity of 0.03.

EXAMPLE 9

Ninety-eight parts of maleic anhydride, 148 parts of phthalic anhydride, 146 parts of ethylene glycol and 25 parts of benzyl alcohol were subjected to a dehydration reaction under heating to obtain an unsaturated alkyd having an acid value of 25. Ten parts of styrene in which 0.005 part of hydroquinone had been dissolved and 15 parts of pentamethylol melamine allyl ether were added to, and sufficiently mixed with and dissolved in, 55 parts of the said unsaturated alkyd to obtain an air-drying unsaturated polyester resin composition, which showed a foaminess of 160 and foam stability of zero at room temperature with no addition of the said surface active agent. Five parts of sodium lauryl sulfate were added to 100 parts of the said air-drying unsaturated polyester resin composition to obtain a resin composition having a foaminess of 180 and foam stability of 98 at room temperature. To said composition were added 1 part of cyclohexanone peroxide and 1 part of cobalt naphthenate. The resulting mixture was agitated in an air atmosphere of 5 atm. in an autoclave for 20 minutes and then the pressure was reduced to 1 atm. to obtain a stable foam comprising minute bubbles. After about ten minutes said foam cured exothermically to provide a cellular resin product having a specific gravity of 0.02 and cells of about 120μ in average diameter.

EXAMPLE 10

Two sheets of lauan square plywood each 300 x 300 x 5 mm. in size were placed 20 mm. apart and the 3 sides were sealed with adhesive tape and placed upright with the open side up. An unsaturated polyester resin foam composition formed in the same way as described in Example 3 was poured between said sheets through the open side. The foams gelled 7 minutes after the pouring, losing fluidity. It took about 40 minutes to cure and the foamed unsaturated polyester resin composition adhered firmly to the plywood to provide a plywood-cellular resin sandwich. The resulting sandwich structure did not break even when it was subjected to a load of 10 kg. nor did peeling take place when it was treated in a boiling water bath for one hour.

What is claimed is:
1. Unsaturated polyester resin composition for producing cellular masses comprising a non-gas producing salt selected from the group consisting of an inorganic salt of sodium, potassium, calcium, magnesium, and aluminum and a salt of an ethanolamine of an organic ester of phosphoric acid and an alcohol from the group consisting of aliphatic hydrocarbon monohydric alcohols containing from 1 to 30 carbon atoms, aliphatic hydrocarbon dihydric alcohols containing from 2 to 30 carbon atoms and aryl alkyl alcohols containing from 7 to 40 carbon atoms, and a polymerizable mixture of an unsaturated polyester resin obtained by the esterification of an alpha,beta-unsaturated dibasic acid with an aliphatic glycol and a co-polymerizable ethylenically unsaturated monomer, said salt being present in an amount of 0.1 to 50 weight parts per 100 weight parts of said polymerizable mixture.
2. The composition claimed in claim 1 wherein said salt is triethanolamine 2-ethylhexyl phosphoric acid monoester.
3. The composition as claimed in claim 1 wherein said salt is triethanolamine di(2-ethylhexyl) phosphate.
4. Unsaturated polyester resin composition for producing cellular masses comprising a polymerizable mixture of an unsaturated polyester resin obtained by the esterification of an alpha,beta-unsaturated dibasic acid with an aliphatic glycol and a co-polymerizable ethylenically unsaturated monomer, a non-gas producing salt selected from the group consisting of an inorganic salt of sodium, potassium, calcium, magnesium, and aluminum and a salt of an ethanolamine of an organic ester of phosphoric acid and an alcohol from the group consisting of aliphatic hydrocarbon monohydric alcohols containing from 1 to 30 carbon atoms, aliphatic hydrocarbon dihydric alcohols containing from 2 to 30 carbon atoms and aryl alkyl alcohols containing from 7 to 40 carbon atoms, said salt being present in an amount of 0.1 to 50 weight parts per 100 weight parts of said polymerizable mixture, and an inorganic filler having particle diameters of 1 micron or less, said filler being present in an amount of 0.1 to 20 weight parts per 100 weight parts of polymerizable mixture.
5. The composition claimed in claim 4 wherein said filler is calcium carbonate.
6. The composition claimed in claim 4 wherein said filler is silicic anhydride.
7. Unsaturated polyester resin composition for producing cellular masses comprising a polymerizable mixture of an unsaturated polyester resin obtained by the esterification of an alpha-beta-unsaturated dibasic acid with an aliphatic glycol and a co-polymerizable ethylenically unsaturated monomer, a non-gas producing salt selected from the group consisting of an inorganic salt of sodium, potassium, calcium, magnesium, and aluminum and a salt of an ethanolamine of an organic ester of phosphoric acid and an alcohol from the group consisting of aliphatic hydrocarbon monohydric alcohols containing from 1 to 30 carbon atoms, aliphatic hydrocarbon dihydric alcohols containing from 2 to 30 carbon atoms and aryl alkyl alcohols containing from 7 to 40 carbon atoms, said salt being present in an amount of 0.1 to 50 weight parts per 100 weight parts of said polymerizable mixture, and a foaming agent.
8. The composition as claimed in claim 7 wherein said foaming agent is ammonium bicarbonate.
9. A process for producing a cellular mass from a polymerizable mixture of an unsaturated polyester resin obtained by the esterification of an alpha-beta-unsaturated dibasic acid with an aliphatic glycol and a co-polymerizable ethylenically unsaturated monomer comprising the steps of admixing with said polymer mixture a non-gas producing salt selected from the group consisting of an inorganic salt of sodium, potassium, calcium, magnesium, and aluminum and a salt of an ethanolamine of an organic ester of phosphoric acid and an alcohol from the group consisting of aliphatic hydrocarbon monohydric alcohols containing from 1 to 30 carbon atoms, aliphatic hydrocarbon dihydric alcohols containing from 2 to 30 carbon atoms and aryl alkyl alcohols containing from 7 to 40 carbon atoms, foaming the resulting mixture and curing the resulting mixture.
10. The process as claimed in claim 9 wherein said salt is triethanolamine 2-ethylhexyl phosphoric acid monoester.
11. The process as claimed in claim 9 wherein said salt is triethanolamine di(2-ethylhexyl) phosphate.
12. The process as claimed in claim 9 wherein said salt is triethanolamine 2-ethylhexyl phosphoric acid monoester and foaming is carried out by dispersing a gas in said mixture by agitation.
13. The process as claimed in claim 9 wherein said salt is triethanolamine di(2-ethylhexyl) phosphate and said foaming is carried out by admixing ammonium bicarbonate with said mixture and heating.
14. The process as claimed in claim 12 wherein said gas is nitrogen.

(References on following page)

References Cited by the Examiner

UNITED STATES PATENTS

| | | | |
|---|---|---|---|
| 2,076,295 | 4/1937 | Curs et al. | 260—2.5 |
| 2,461,761 | 2/1949 | Nye | 260—2.5 |
| 2,489,943 | 11/1949 | Wilson | 260—2.5 |
| 2,529,512 | 11/1950 | Ott | 260—869 |
| 2,537,520 | 1/1951 | Eger | 260—2.5 |
| 2,559,891 | 7/1951 | Meyer | 260—869 |
| 2,577,414 | 12/1951 | Frazer | 260—2.5 |
| 2,653,112 | 9/1953 | Banigan | 260—865 |
| 2,853,471 | 9/1958 | Beadell | 260—29.6 |
| 3,062,682 | 11/1962 | Morgan et al. | 260—79.6 |

FOREIGN PATENTS 652,770  5/1951  Great Britain.

OTHER REFERENCES

Schwartz et al.: Surface Active Agents and Detergents, vol. II, copyright 1958, by Interscience Publishers, Inc., pages 25–102.

MURRAY TILLMAN, *Primary Examiner.*

LEON J. BERCOVITZ, *Examiner.*

M. FOELAK, *Assistant Examiner.*